United States Patent Office 3,732,309
Patented May 8, 1973

3,732,309
POLYEPOXIDE-POLYMERCAPTAN-AMINE ADDUCTS
Edward William Garnish, Saffron Walden, and Clifford George Haskins, Haslingfield, England, assignors to Ciba-Geigy AG, Basel, Switzerland
No Drawing. Filed Dec. 30, 1969, Ser. No. 889,311
Claims priority, application Great Britain, Jan. 2, 1969, 402/69
Int. Cl. C07c 87/00, 87/14, 87/20
U.S. Cl. 260—583 P    16 Claims

ABSTRACT OF THE DISCLOSURE

As curing agents for epoxy resins adducts obtained by reaction of (a) a polyepoxide having, per average molecule, more than one 1,2-epoxide group of the formula

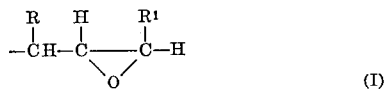
(I)

directly attached to oxygen, to nitrogen, or to sulphur, where R and $R^1$ each represent hydrogen or together represent —$CH_2CH_2$—, (b) a polymercaptan containing at least one pair of —SH groups in which one—SH group is separated from other by a chain of at least six carbon, or carbon and oxygen, atoms, and (c) an amine

---

This invention relates to adducts, to their use for curing epoxide resins, and to products obtained by so curing epoxide resins.

It is well known that epoxide resins, i.e. substances containing more than 1,2-epoxide group per average molecule, can be cured to form products which have valuable technical properties. However, for certain purposes the products would be too rigid, and flexibilisers are then incorporated in the mixture of epoxide resin and curing agent to obtain a more resilient and tougher product.

A frequently used class of flexibiliser comprises substances containing at least two mercaptan (—SH) groups per molecule separated from each other by a chain of at least six carbon, or carbon and oxygen, atoms. These polymercaptans are often used in conjunction with amine curing agents, especially aliphatic polyamines, because tough, flexible products can be obtained by reaction at room temperature (20° C.) or a little above. But a disadvantage is that usually the three components—the epoxide resin, the flexibiliser, and the amine curing agent—have to be mixed just before use. It would be preferable to have to mix only two components but often this is not possible. The epoxide resin may not be stored admixed with the curing agent: if the epoxide resin and a polymercaptan flexibiliser are mixed they react, although more slowly, and there is the further disadvantage that the amine curing agent is often volatile and has to be handled carefully to minimise absorption of moisture, discomfort from its odour, and possible dermatitic reactions—an inconvenience when the materials are handled on production line. Nor is it frequently practicable to store a mixture of the flexibiliser and amine curing agent, because many primary or secondary amines react with an important group of flexibilisers, esters of mercaptocarboxylic acids with poly(oxyalkylene) polyols.

It has now been found that these disadvantages may be overcome by curing epoxide resins with adducts prepared by reaction of certain polyepoxides with a polymercaptan flexibiliser and an amine. Only two components, the adduct and the epoxide resin, need to be handled on the production line, and the adducts are more convenient to use than many aliphatic polyamine curing agents.

The present invention accordingly provides adducts obtained by reaction of (a) A polyepoxide having, per average molecule, more than one 1,2-epoxide group of formula

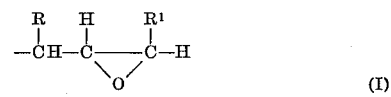
(I)

directly attached to oxygen, to nitrogen, or to sulphur, where R and $R^1$ each represent hydrogen or together represent —$CH_2CH_2$—, (b) A polymercaptan containing at least one pair of —SH groups in which one —SH group is separated from the other by a chain of at least six carbon, or carbon and oxygen, atoms, and (c) An amine.

There is also provided curable compositions comprising an epoxide resin and, as curing agent therefor, an adduct of this invention.

Adducts preferred for use as curing agents for epoxide resins are those wherein sufficient polymercaptan (b) is used to provide at least 1.3, and preferably from 1.5 to 2.5, —SH equivalents per equivalent of the said 1,2-epoxide groups of the polyepoxide (a). The amine (c) may be a primary or secondary amine, in which case there will generally be used sufficient to provide from 0.01 to 0.25, and especially from 0.05 to 0.15, active hydrogen equivalent per equivalent of the said 1,2-epoxide groups in (a). Such primary or secondary amines may also contain tertiary amino groups. It is also possible to use tertiary amines containing no primary or secondary amino groups: in such a case there is preferably used from about 5 to 25 parts, or even from 3 to 35 parts, by weight of the tertiary amine per 100 parts by weight of (a).

The adducts are best prepared by adding the amine (c) to a mixture of components (a) and (b). The adducts may be formed by reaction of the components at a temperature in the range 35° C. to 125° C., especially about 50° C. to 100° C.: in many cases the reaction is exothermic and to apply heat is unnecessary. Adduct formation is substantially completed when the viscosity of the product does not change markedly on heating at, say, 40° C. Preferably the adducts have a 1,2-epoxide content of less than 0.2 equivalent, and better, less than 0.05 equivalent, per kilogram.

Polyepoxides preferred as component (a) are those wherein the said 1,2-epoxide groups are further of the formula

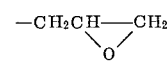

i.e. R and $R^1$ each represent hydrogen.

Examples of polyepoxides containing such groups directly attached to oxygen are polyglycidyl esters obtainable by reaction of a substance containing two or more carboxylic acid groups with epichlorohydrin or glycerol dichlorohydrin in the presence of an alkali. Such polyglycidyl esters may be derived from aliphatic carboxylic acids, e.g. oxalic, succinic, adipic, sebacic acid, and dimerised or trimerised linoleic acid; from cycloaliphatic carboxylic acids such as hexahydrophthalic, methylhexahydrophthalic, tetrahydrophthalic, and methyltetrahydrophthalic acid; and from aromatic carboxylic acids such as phthalic acid, isophthalic acid, and terephthalic acid.

There may also be used polyglycidyl ethers obtainable by reaction of a substance containing two or more alcoholic hydroxyl groups, or two or more phenolic hydroxyl groups, with epichlorohydrin or glycerol dichlorohydrin, either under alkaline conditions or in the presence of an acidic catalyst with subsequent treatment with alkali. The polyhydric alcohols may be aliphatic, for example ethylene glycol or diethylene glycol and higher poly(oxyethylene) glycols, propylene glycol and poly(oxypropylene) glycols, propane-1,3-diol, butane-1,4-diol, poly(oxybutylene) glycols, pentane - 1,5 - diol, hexane - 1,6 - diol, hexane - 2,4,6 - triol, glycerol, 1,1,1-trimethylolpropane, pentaerythritol, and poly(epichlorohydrin); cycloaliphatic, such as quinitol, resorcitol, bis(4 - hydroxycyclohexyl)methane, 1,1 - bis(hydroxymethyl)cyclohex-3-ene, and 2,2 - bis(4 - hydroxycyclohexyl)propane; or they may contain aromatic nuclei, such as adducts of alkylene oxides with amines, e.g. N,N-bis(2-hydroxyethyl)aniline and 4,4'-bis(2-hydroxyethylamino)diphenylmethane, or with phenols, e.g. 2,2 - bis(4 - (2-hydroxyethoxy)phenyl)propane and 2,2-bis(4-hydroxypropoxyphenyl)propane. The polyhydric phenols may be mononuclear, for example resorcinol, catechol, and hydroquinone, or polynuclear, such as 4,4' - dihydroxydiphenyl, bis(4-hydroxyphenyl) methane, bis (4 - hydroxyphenyl) sulphone, 2,2-bis(4 - hydroxyphenyl)propane (otherwise known as bisphenol A), 1,1,2,2-tetrakis(4-hydroxyphenyl)ethane, and novolacs formed from aldehydes such as formaldehyde, acetaldehyde, chloral or furfuraldehyde with phenols such as phenol itself, p-chlorophenol, p-cresol, and p-tert. butylphenol.

There may further be employed poly(N-glycidyl)compounds such as those obtainable by dehydrochlorination of the reaction products of epichlorohydrin and amines containing at least two hydrogen atoms directly attached to nitrogen such as aniline, n-butylamine, bis(4-aminophenyl)methane, bis(4 - aminophenyl) sulphone, and bis-(4-methylaminophenyl)methane. Other poly(N-glycidyl) compounds that may be used include triglycidyl isocyanurate, N,N'-diglycidyl derivatives of cyclic alkylene ureas such as ethyleneurea and 1,3 - propyleneurea, and N,N'-diglycidyl derivatives of hydantoins such as 5,5-dimethylhydantoin.

Examples of S-glycidyl compounds are those obtained by reaction of dithiols such as 1,4-bis(mercaptomethyl) benzene and hexane-1,6-dithiol with epichlorohydrin in the presence of alkali; by addition of 3-chloro-1-mercaptomethyl)benzene and hexane-1,6-dithiol with epichlorohydrin in the presence of alkali; by addition of 3-chloro-1 - mercaptopropan - 2-ol to double bonds of a diene such as norbornadiene (bicyclo[2.2.1]hepta - 2,5 - diene) or 3,8 - divinyl - 2,4,7,9-tetraoxaspiro[5.5]undecane followed by dehydrochlorination; or by etherification or transetherification with 3 - chloro - 1 - mercaptopropan-2-ol of a hydroxymethyl or lower alkoxymethyl group directly attached to nitrogen, such as in a hexamethylolmelamine, followed by dehydrochlorination.

Polyepoxides having terminal 1,2-epoxide groups attached to different kinds of atoms may be employed, e.g. the N,N,O-triglycidyl derivative of p-aminophenol, or glycidyl esters-glycidyl ethers of substances such as salicylic acid, 4,4 - bis(p-hydroxyphenyl)pentanoic acid or phenolphthalein.

Examples of polyepoxides having groups of Formula I where R and R¹ together represent —CH$_2$CH$_2$— are bis-(2,3-epoxycyclopentyl) ether and 1,2-bis(2,3-epoxycyclopentyloxy)ethane. If desired, there may be used a polyepoxide having one group of Formula I where R and R¹ each denote hydrogen and another group of Formula I where R and R¹ together denote —CH$_2$CH$_2$—, such as 2,3-epoxycyclopentyl glycidyl ether.

Preferred polyepoxides are polyglycidyl ethers of polyhydric phenols or polyhydric alcohols and polyglycidyl esters of aromatic or cycloaliphatic polycarboxylic acids, especially those having a 1,2-epoxide content of at least 2 equivalents per kilogram.

Particularly preferred polymercaptans (b) are esters of formula

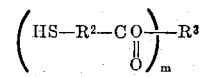

where R² denotes an alkylene hydrocarbon group, especially —CH$_2$— or —CH$_2$CH$_2$—, $m$ is an integer of value 2 to 6, and R³ denotes the residue, after removal of $m$ alcoholic hydroxyl groups, of a polyhydric alcohol, the positions of at least two of the

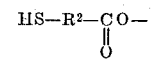

groups attached to the residue R³ being such that the indicated HS— groups are separated from each other by a linear chain of at least six carbon, or carbon and oxygen, atoms. R³ may thus represent the residue of either an α,ω-diol wherein the chain is composed solely of carbon atoms such as hexane-1,6-diol, or preferably of a poly(oxyalkylene) polyol such as a polyoxyethylene glycol, polyoxypropylene glycol, polyoxyethylene-polyoxypropylene glycol, polyoxybutylene glycol or an oxyalkylated alkanepolyol, i.e. an adduct of an alkylene oxide such as ethylene oxide and/or propylene oxide with an aliphatic alcohol having at least three alcoholic hydroxyl groups, such as glycerol, hexane-1,2,5-triol, hexane-1,2,6-triol, sorbitol or mannitol. Particularly suitable flexibilisers are esters of a polyoxypropylene glycol or a polyoxypropylene triol having an average molecular weight within the range 300 to 2500 with thioglycollic acid or 3-mercaptopropionic acid.

Another class of polymercaptans which may be used as component (b) is constituted by those oligomers and polymers containing a repeating disulphide unit obtained by reaction of dichlorodiethyl formal with an alkaline hydrosulphide, or with an alkaline polysulphide followed by reductive scission. These materials are somewhat complex: frequently a small proportion of a trichloropropane is included in the reaction with the polysulphide to increase the thiol functionality, but essentially these materials may be represented by the formula $$HS(C_2H_4OCH_2OC_2H_4SS)_nC_2H_4OCH_2OC_2H_4SH$$

where $n$ is an integer which may have an average value of, for instance, from about 3 to 6.

Other suitable polymercaptans are obtained by reaction of a chlorohydrin ether of a polyhydric alcohol with an alkaline hydrosulphide. A polyol, which may be designated R³(OH)$_m$ where R³ and $m$ have the meanings previously given, is treated with epichlorohydrin and the chlorohydrin ether so obtained is caused to react with the hydrosulphide. Side-reactions occur, such as addition of the chlorohydrin ether to epichlorohydrin, but essentially formation of the main products may be represented by the equations

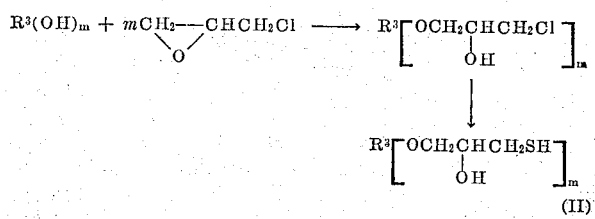

If desired, the chlorohydrin ether may first be treated with an alkylene oxide, for example, of formula

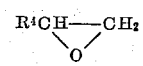

where R⁴ denotes hydrogen or methyl, to obtain a polymercaptan of different reactivity. The main reactions may be represented thus

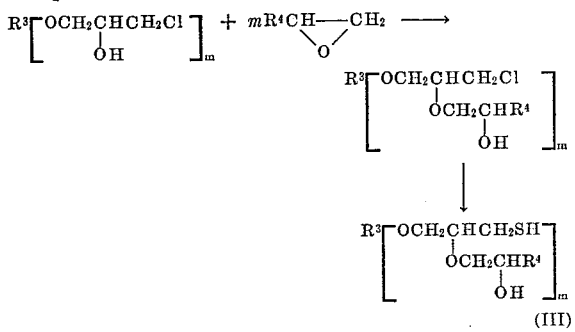

Yet other polymercaptans (b) are esters, including polyesters, which contain, directly attached to carbon atoms, $n$ groups of formula $$-(O)_p-CO-(O)_q-R^5-(O)_q-CO-(O)_p-R^2SH \quad (IV)$$

per molecule, where $p$ and $q$ are each zero or 1, but are not the same,
$n$ is an integer of at least 3 and at most 6,
$R^2$ denotes an alkylene hydrocarbon group, especially $-CH_2-$ or $-CH_2CH_2-$, and
$R^5$ denotes a divalent organic radical which is directly linked through a carbon atom or carbon atoms thereof to the indicated $-O-$ or $-CO-$ units.

Such polymercaptans have been described in, e.g., U.S. patent specification 3,187,573, French patent specification 1,503,633, and United Kingdom patent specification 941,829.

It is to be understood that, in the compounds of Formulae II and III, and those containing $n$ groups of Formula IV per molecule, at least two of the indicated HS— groups are separated from each other by a linear chain of at least six carbon, or carbon and oxygen, atoms.

Amines suitable as component (c) include aliphatic, cycloaliphatic, and heterocyclic compounds. The amine employed may be a monoprimary amine such as n-butylamine, cyclohexylamine, or furfurylamine. Or it may be a polyprimary amine such as ethylenediamine, propane-1,2-diamine, propane-1,3-diamine, 2,2,4-trimethyl- and 2,3,3-trimethyl-hexane-1,6-diamines, bis(4-aminocyclohexyl)methane and 2,2-bis(4-aminocyclohexyl)propane. Also suitable are monosecondary amines such as di-n-butylamine, N-methylcyclohexylamine, and piperidine, and polysecondary amines such as N,N'-dimethylethylenediamine, bis(4-methylaminocyclohexyl)methane, and piperazine. There may also be used monotertiary amines such as tri-n-butylamine, tricyclohexylamine and pyridine, as well as polytertiary amines such as N,N,N',N'-tetrakis-(2-cyanoethyl)ethylenediamine, bis(4-dimethylaminocyclohexyl)methane, and 2,4,6-tris(dimethylaminomethyl) phenol.

It is possible to use polyamines of mixed functionality, e.g. primary-secondary polyamines such as diethylenetriamine and triethylenetetramine; primary-tertiary amines such as N,N-dimethylpropane-1,3-diamine and 4-aminopyridine; secondary-tertiary amines such as N-methylpiperazine or N,N,N'-trimethylethylenediamine. and primary-secondary-tertiary amines such as N-(2-aminoethyl) piperazine.

The preferred amines contain at least one amino group of formula

where $R^6$ and $R^7$ each represent a hydrogen atom or a methyl group.

By selection of the type and proportion of the components (a), (b), and (c) employed, there may be obtained adducts which are liquid at room temperature and which can be used with the epoxide resin in convenient weight:weight or volume:volume ratios.

Epoxide resins which may be cured with the adducts are preferably those polyepoxides already specified as component (a); there may also be used those containing, per molecule, one 1,2-epoxide group of Formula I attached as aforesaid and also one or more 1,2-epoxide groups directly attached to a five- or six-membered carbocyclic ring, such as 3,4-epoxycyclohexyl glycidyl ether, 3,4-epoxycyclohexylmethyl glycidyl ether, and 4-oxatetracyclo[6.2.1.0$^{2,7}$0$^{3,5}$]undec-9-yl glycidyl ether; and those containing no 1,2-epoxide group of Formula I attached as aforesaid but two or more 1,2-epoxide groups fused to five- or six-membered carbocyclic rings, such as 3,4-epoxycyclohexylmethyl 3,4-epoxycyclohexanecarboxylate, 3,4-epoxy-6-methylcyclohexylmethyl 3,4 - epoxy-6-methylcyclohexanecarboxylate, dicyclopentadiene dioxide, 3-(3,4-epoxycyclohexyl) - 8,9 - epoxy-2,4-dioxaspiro[5.5]undecane, and 3-(3,4-epoxy-6-methylcyclohexyl)-8,9-epoxy-11-methyl-2,4-dioxaspiro[5.5]undecane.

The amounts of adduct to be used as curing agent depends on factors such as 1,2-epoxide content of the epoxide resin to be cured and the proportions of the components (a), (b), and (c) employed to form the adduct. Sufficient adduct is used to convert the epoxide resin into an insoluble, infusible product, usually about 50 to 150 parts by weight of adduct being taken per 100 parts by weight of epoxide resin.

Conveniently, the adduct and the epoxide resin are supplied as a two-component pack.

The curable compositions may contain reactive diluents, fillers, plasticisers, suspending agents or colouring agents. They may be used e.g. as casting, potting, encapsulating, coating or adhesive resins.

The following examples illustrate the invention. Parts are by weight.

EXAMPLES I–X

As component (a) there was used a polyglycidyl ether of bisphenol A which was prepared in a known manner, containing 5–5.2 epoxide equiv./kg. and having a viscosity at 21° C. in the range 200 to 400 poises. This polyglycidyl ether is designated "Polyepoxide I." As component (b) there was used in Examples I–VIII the ester ("Polythiol A") of a polyoxypropylenetriol having a molecular weight of about 700, derived from propylene oxide and glycerol and available from Dow Chemical Company as "Voranol CP 700," with 3 mol of 3-mercaptopropionic acid. In Example IX, component (b) was an ester of the same polyoxypropylenetriol with 3 mol of thioglycollic acid ("Polythiol B"), and in Example X, component (b) was "Thiokol LP–3" of Thiokol Chemical Corporation. According to the manufacturers, "Thiokol LP–3" has an average molecular weight of 1000, a viscosity at 27° C. of from 7 to 12 poises and the percent cross-linking is 2.0, and it is substantially of the formula $$HS(C_2H_4OCH_2OC_2H_4SS)_6C_2H_4OCH_2OC_2H_4SH$$

N,N-dimethylpropane-1,3-diamine (5 grams) was added to a mixture at about 21° C. of 20 grams of Polyepoxide I and 80 grams of Polythiol A: an exothermic reaction ensued, the temperature of the mixture rising to 80° C. The mixture so obtained was allowed to cool to 21° C., when its viscosity was 400 poises. The mercaptan content was determined by addition of silver nitrate in pyridine followed by titration of the liberated nitric acid with aqueous caustic soda; the decrease from the original value was compatible with the assumption that the Polyepoxide I had reacted with both the amine and the Polythiol A. The viscosity of a sample did not change on prolonged heating at 40° C., indicating the epoxide groups to have been substantially consumed.

The adduct (105 parts) was mixed with 80 parts of Polyepoxide I: the gelation time of a 30 gram-sample was measured by repeatedly dipping a rod into the mixture and withdrawing it and noting when the mixture became rubbery.

In further experiments, 5 grams of other amines were mixed at 21° C. with 20 grams of Polyepoxide I and 80 grams of Polythiol A, or 80 grams of Polythiol B, or 120 grams of Polythiol C, is indicated, to form adducts. The adducts (105 parts) were mixed with 80 parts of Polyepoxide I and the gelation times at 22° C. or 100° C. were noted. Gelation times at 100° C. were measured as thin films using a Köfler bench. The results are shown in Table I.

EXAMPLE XI

Aluminum alloy sheets, 1.63 mm. thick and available under the designation "2L 73 Alclad," were degreased, pickled as prescribed in the British Ministry of Aviation Aircraft Process Specification DTD–915 B, washed in running water, and dried. A mixture of 100 parts of Polyepoxide I and 120 parts of the adduct prepared in Example I was used to prepare single lap joints 2.54 cm. x 1.27 cm., the mixture being cured by heating for 10 minutes at 100° C. The shear strength of the bond was 2.35 kp./mm.$^2$

EXAMPLES XII–XIV

As component (a) there was used diglycidyl tetrahydrophthalate, containing 6.5 epoxide equiv./kg.: this is designated "Polyepoxide II." As component (b), Polythiol A was used.

A five-gram portion of an amine was added to mixtures each containing 20 grams of Polyepoxide II and 80 grams of Polythiol A. The adduct (102 parts) was mixed with, as indicated in Table II, 80 parts of Polyepoxide I, or 80 parts of Polyepoxide III, or 52 parts of Polyepoxide IV, and the gelatin time of a 30 gram-sample was measured as described for Examples I–X.

"Polyepoxide III" denotes the tetra(N-glycidyl( derivative of bis(4-aminophenyl)methane, having an epoxide content of between 7.6 and 8.0 equiv./kg., while "Polyepoxide IV" denotes a polyglycidyl ether of a phenol-formaldehyde novolac (molar ratio of phenol:formaldehyde 1:0.57) having an epoxide content of between 5.4 and 5.8 equiv./kg.

molecule, more than one 1,2-epoxide group of the formula

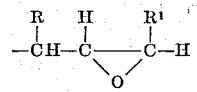

directly attached to oxygen, where R and R$^1$ each represent hydrogen or together represent —CH$_2$CH$_2$—; (b) a polymercaptan which is substantially of the formula $$HS(C_2H_4OCH_2OC_2H_4SS)_nC_2H_4OCH_2OC_2H_4SH$$

wherein $n$ is an integer having an average value of from 3 to 6; and (c) an aliphatic amine.

2. Adducts according to claim 1, wherein there is used sufficient polymercaptan (b) to provide at least 1.3 —SH equivalents per equivalent said 1,2-epoxide group of the polyepoxide (a).

3. Adducts according to claim 2, wherein the polymercaptan (b) provides from 1.5 to 2.5 —SH equivalents per equivalent said 1,2-epoxide group of the polyepoxide (a).

4. Adducts according to claim 1, wherein the amine (c) provides from 0.01 to 0.25 active hydrogen equivalent per equivalent said 1,2-epoxide group of the polyepoxide (a).

5. Adducts according to claim 4, wherein the amine (c) provides from 0.05 to 0.15 active hydrogen equivalent per equivalent said 1,2-epoxide group of the polyepoxide (a).

6. Adducts according to claim 1, formed by reaction of the polyepoxide (a), the polymercaptan (b), and the amine (c) at from 35° C. to 125° C.

7. Adducts according to claim 6, wherein reaction is effected at from 50° C. to 100° C.

8. Adducts according to claim 1, wherein the polyepoxide (a) has a 1,2-epoxide content of at least 2 equivalents per kilogram.

9. Adducts according to claim 1, wherein there is used from 5 to 25 parts by weight of the amine (c) per 100 parts by weight of the polyepoxide (a), said amine being a tertiary amine containing no primary or secondary amine group.

TABLE I

| Example number | Amine | Polythiol | Maximum temperature reached by mixture (° C.) | Viscosity adduct at 21° C. (poises) | Gelation times at— | |
|---|---|---|---|---|---|---|
| | | | | | 22° C. | 100° C. |
| I | N,N-dimethylpropane-1,3-diamine | A | 80 | 400 | 10 min. | 3 min. |
| II | N,N-diethylpropane-1,3-diamine | A | 80 | ~350 | 2 hours | 20 min. |
| III | n-Butylamine | A | 27 | 60 | | 55 min. |
| IV | Triethylenetetramine | A | 30 | 435 | | 9 min., 25 sec. |
| V | N-(2-hydroxypropyl)-triethylenetetramine | A | 31 | 469 | | 14 min. |
| VI | N-benzyldimethylamine | A | 50 | 475 | 8 min. | 30 sec. |
| VII | 2,4,6-tris(dimethylaminomethyl)phenol | A | 40 | 210 | 14 min. | 2 min., 23 sec. |
| VIII | N-(2-aminoethyl)piperazine | A | 27 | 124 | | 6 min., 54 sec. |
| IX | N,N-dimethylpropane-1,3-diamine | B | 80 | $^1$ 400 | 10 min. | |
| X | do | C | 60 | $^1$ 200 | 30 min. | |

$^1$ At 25° C.

TABLE II

| Example number | Amine | Maximum temperature reached by mixture (° C.) | Viscosity adduct at 25° C. (poises) | Gelation times at 22° C. with— | | |
|---|---|---|---|---|---|---|
| | | | | Polyepoxide I | Polyepoxide II | Polyepoxide II |
| XII | N,N-dimethylpropane-1,3-diamine | 70 | 350 | 12 min. | 30 min. | 14 min. |
| XIII | N-(2-hydroxypropyl)-triethylenetetramine | 45 | 385 | 80 min. | 150 min. | 150 min. |
| XIV | N-benzyldimethylamine | 30 | 235 | 9 min. | 16 min. | 11 min. |

We claim:
1. As curing agents for epoxy resins, adducts obtained by reaction of (a) a polyepoxide having, per average

10. Adducts according to claim 1, wherein there is used from 3 to 35 parts by weight of the amine (c) per 100 parts by weight of the polyepoxide (a), said amine being a tertiary amine containing no primary or secondary amino group.

11. Adducts according to claim 1 wherein the amine (c) contains at least one amino group of formula

where R⁶ and R⁷ each represent a hydrogen atom or a methyl group.

12. Adducts according to claim 1 wherein the amine (c) is N,N-dimethylpropane-1,3-diamine, N,N-diethylpropane-1,3-diamine, n-butylamine, triethylenetetramine, or N-(2-hydroxypropyl)triethylenetetramine.

13. Adducts according to claim 1, having a 1,2-epoxide content of less than 0.05 equivalent per kilogram.

14. Adducts according to claim 1, having a 1,2-epoxide content of less than 0.2 equivalent per kilogram.

15. An adduct according to claim 1 in which the amine (c) is N,N-dimethylpropane-1,3-diamine.

16. An adduct of claim 1 wherein the polyepoxide (a) is derived from a polyglycidyl ether of bisphenol A; and the amine (c) is N,N-dimethylpropane-1,3-diamine.

References Cited

UNITED STATES PATENTS

| | | | |
|---|---|---|---|
| 2,901,461 | 8/1959 | Auerbach et al. | 260—584 R X |
| 3,325,476 | 6/1967 | Dowbenko | 260—584 R X |
| 3,354,209 | 11/1967 | Brack | 260—584 R X |

LEWIS GOTTS, Primary Examiner

R. L. RAYMOND, Assistant Examiner

U.S. Cl. X.R.

260—47 EP, 268 R, 293.4, 348 R, 563 R, 570.7, 583 R, 584 R